(12) United States Patent
Mikawa et al.

(10) Patent No.: US 11,650,679 B2
(45) Date of Patent: May 16, 2023

(54) PEN HOLDER AND DISPLAY SYSTEM

(71) Applicants: Akihisa Mikawa, Kanagawa (JP); Keiichi Yoshida, Kanagawa (JP)

(72) Inventors: Akihisa Mikawa, Kanagawa (JP); Keiichi Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/805,300

(22) Filed: Jun. 3, 2022

(65) Prior Publication Data

US 2022/0397965 A1 Dec. 15, 2022

(30) Foreign Application Priority Data

Jun. 11, 2021 (JP) .............................. JP2021-098268

(51) Int. Cl.
*G06F 3/039* (2013.01)
*G06F 1/16* (2006.01)
*G06F 3/0354* (2013.01)

(52) U.S. Cl.
CPC ............ *G06F 3/039* (2013.01); *G06F 1/1656* (2013.01); *G06F 3/03545* (2013.01); *G06F 2200/1632* (2013.01)

(58) Field of Classification Search
CPC .... G06F 3/039; G06F 1/1656; G06F 3/03545; G06F 2200/1632; G06F 3/0393; G06F 1/1684; G06F 3/03
See application file for complete search history.

(56) References Cited

U.S. PATENT DOCUMENTS

| | | | | |
|---|---|---|---|---|
| 9,575,579 | B2* | 2/2017 | Ashcraft | G06F 3/0393 |
| 10,908,708 | B1* | 2/2021 | Menendez | G06F 3/0346 |
| 11,474,623 | B1* | 10/2022 | Chen | G06F 3/03545 |
| 2021/0149447 | A1 | 5/2021 | Mikawa | |
| 2021/0153364 | A1 | 5/2021 | Kosukegawa et al. | |
| 2021/0153365 | A1 | 5/2021 | Mikawa | |
| 2022/0147159 | A1* | 5/2022 | Stancil | G06F 3/039 |

FOREIGN PATENT DOCUMENTS

| | | |
|---|---|---|
| JP | 3182660 | 3/2013 |
| JP | 2020-095312 | 6/2020 |
| JP | 2020-152090 | 9/2020 |
| JP | 2020-197982 | 12/2020 |

* cited by examiner

*Primary Examiner* — Lunyi Lao
*Assistant Examiner* — Jarurat Suteerawongsa
(74) *Attorney, Agent, or Firm* — IPUSA, PLLC

(57) ABSTRACT

A pen holder includes a holder to hold an electronic pen including a replaceable pen tip that contacts a screen of a display apparatus for input to the display apparatus. The pen holder further includes a pulling-out portion to pull out the pen tip, having an open end in a first direction and including a gripping portion. The gripping portion includes a first wall and a second to grip the pen tip inserted from the open end in the first direction. The first wall linearly extends in the first direction, and the second wall linearly extends in the first direction and disposed at a distance from the first wall in a second direction intersecting the first direction.

10 Claims, 8 Drawing Sheets

PEN HOLDER AND DISPLAY SYSTEM

CROSS-REFERENCE TO RELATED APPLICATION

This patent application is based on and claims priority pursuant to 35 U.S.C. § 119(a) to Japanese Patent Application No. 2021-098268, filed on Jun. 11, 2021, in the Japan Patent Office, the entire disclosure of which is hereby incorporated by reference herein.

BACKGROUND

Technical Field

Embodiments of this disclosure relate to a pen holder and a display system.

Related Art

There are display apparatuses (information display apparatuses) that enable a user to write or draw characters or graphics on an image displayed on a screen using a dedicated electronic pen.

Since the pen tip of an electronic pen wears out after a long period of use, the pen tip is generally replaceable. A replaceable pen tip is sometimes called a replaceable core. When the pen tip of the electronic pen is worn out, the worn pen tip is pulled out and replaced with a new pen tip.

SUMMARY

In one aspect, a pen holder includes a holder to hold an electronic pen including a replaceable pen tip that contacts a screen of a display apparatus for input to the display apparatus. The pen holder further includes a pulling-out portion to pull out the pen tip, having an open end in a first direction and including a gripping portion. The gripping portion includes a first wall and a second to grip the pen tip inserted from the open end in the first direction. The first wall linearly extends in the first direction, and the second wall linearly extends in the first direction and disposed at a distance from the first wall in a second direction intersecting the first direction.

In another aspect, a display system includes the display apparatus and the pen holder described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
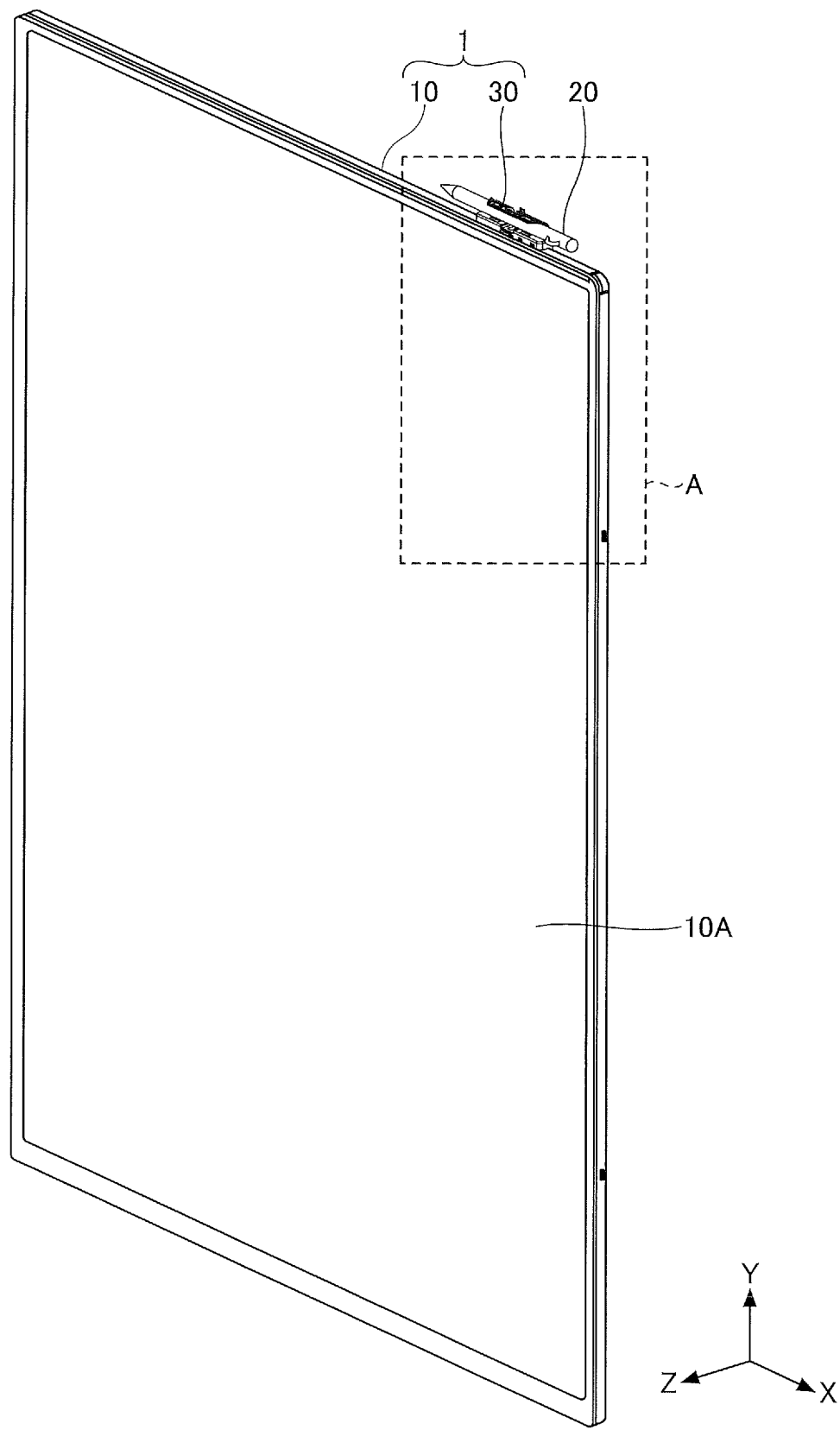
FIG. 1 is a perspective view of an information display system according to one embodiment of present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In order to facilitate understanding, the scale of each part in the drawing may differ from the actual scale. In the directions such as parallel, right angle, orthogonal, horizontal, vertical, up, and down, and lateral directions, a deviation is allowed to the extent that does not impair the effect of embodiments of the present disclosure. The shape of a corner is not limited to a rectangular shape and may be rounded into an arcuate shape. The terms parallel, right-angled, orthogonal, horizontal, and vertical may include substantially parallel, substantially right-angled, substantially orthogonal, substantially horizontal, and substantially vertical, respectively.

Information Display System

Figure 2:
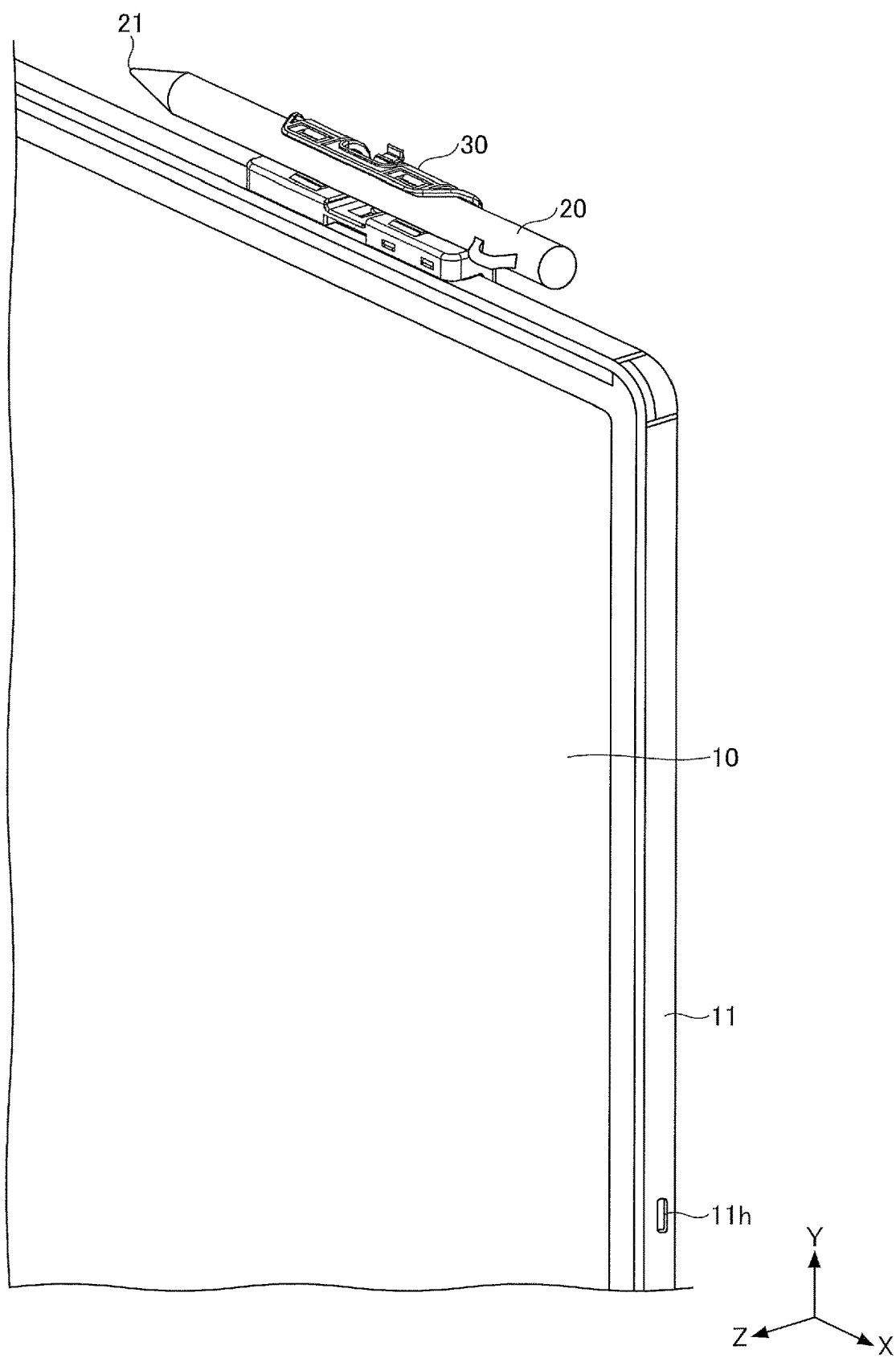
FIG. 2 is an enlarged perspective view of a portion of the information display system illustrated in FIG. 1.

FIG. 1 is a perspective view of an information display system 1 according to the present embodiment. FIG. 2 is an enlarged perspective view of the information display system 1 according to the present embodiment. Specifically, FIG. 2 is an enlarged perspective view of a portion A in FIG. 1.

For convenience of explanation, a virtual three-dimensional coordinate system (XYZ Cartesian coordinate system) including an X-axis, a Y-axis, and a Z-axis that are orthogonal to each other may be set in the drawings. The coordinate system is defined for the sake of explanation and does not limit the posture of the information display system 1 or an information display apparatus 10 described later.

In the present disclosure, unless otherwise specified, the X-axis direction is a direction parallel to a screen 10A of the information display apparatus 10 and is a short-side direction of the screen 10A. The Y-axis direction is a direction parallel to the screen 10A of the information display apparatus 10 and is a longitudinal direction of the screen 10A. In other words, the XY plane parallel to the X-axis direction and the Y-axis direction is a plane parallel to the screen 10A of the information display apparatus 10. The Z axis extends in a direction perpendicular to the X and Y axes. In other words, the YZ plane parallel to the Y-axis direction and the Z-axis direction is a plane perpendicular to the screen 10A of the information display apparatus 10. Similarly, the ZX plane parallel to the X-axis direction and the Z-axis direction is a plane perpendicular to the screen 10A of the information display apparatus 10.

The X-axis direction may be referred to as a lateral direction, the Y-axis direction may be referred to as a vertical direction, and the Z-axis direction may be referred to as a thickness direction. Further, the +X side and the −X side with respect to a subject may be referred to as the right side and the left side, respectively. Similarly, the +Y side and the −Y side with respect to the subject may be referred to as the upper side and the lower side, respectively, and the +Z side and the −Z side with respect to the subject may be referred to as the front side and the rear side (or back side), respectively. In some cases, viewing the information display apparatus 10 from the +Z side is referred to as viewing from the front side. In some cases, viewing the information display apparatus 10 from the −Z side is referred to as viewing from the rear side.

The information display system 1 includes the information display apparatus 10 and a pen holder 30. A user inputs information to the information display apparatus 10 using an electronic pen 20. The electronic pen 20 is used for input to the information display apparatus 10. The electronic pen 20 includes a pen tip 21 (may be called a "pen tip") that comes into contact with the screen 10A of the information display apparatus 10. When the pen tip 21 of the electronic pen 20 contacts the screen 10A, the information display apparatus 10 detects an input from the electronic pen 20. The pen tip 21 (pen tip) of the electronic pen 20 is replaceable.

The pen holder 30 is attached to the information display apparatus 10. The pen holder 30 holds the electronic pen 20 in a detachable manner. For example, when the electronic pen 20 is not in use, the user attaches the electronic pen 20 to the pen holder 30. To use the electronic pen 20, the user removes the electronic pen 20 from the pen holder 30.

The information display system 1 may include the electronic pen 20 in addition to the information display apparatus 10 and the pen holder 30.

Information Display Apparatus

The information display apparatus 10 displays a screen image of a personal computer (PC) or the like. The information display apparatus 10 enables the user to write and draw characters and graphics on an image displayed on the screen 10A using the electronic pen 20. As one feature, the information display apparatus 10 according to the present embodiment is thin as illustrated in FIGS. 1 and 2. Since the information display apparatus 10 according to the present embodiment that is thin and light, the portability is good even when a large display (large in inches) is used.

Further, as illustrated in FIGS. 1 and 2, as another feature of the information display apparatus 10 according to the present embodiment, the entire rear face is flat. Accordingly, for example, the information display apparatus 10 can be placed flat on a desk, and a plurality of viewers can have a discussion around the information display apparatus 10. Further, the information display apparatus 10 accepts inputs with a plurality of electronic pens 20 to enable simultaneous writing by a plurality of persons. Further, both the body of the information display apparatus 10 and the electronic pen 20 are dustproof and waterproof so that the information display apparatus 10 can be used outdoors.

The information display apparatus 10 according to the present embodiment does not have a space for accommodating the electronic pen 20 therein. The information display system 1 includes, as a dedicated pen holder, the pen holder 30 attached to the information display apparatus 10. The user attaches the pen holder 30 to a specific position on the information display apparatus 10.

The specific position for attaching the pen holder 30 is, for example, a hole 11h in a frame 11 on the side face of the information display apparatus 10. The hole 11h is for a security lock. The information display apparatus 10 has the hole 11h at a plurality of positions on the side faces of a housing.

The information display apparatus 10 can be installed in various postures. For example, the information display apparatus 10 supports landscape orientation and portrait orientation, and may be placed flat, leaned against a wall, or mounted on a wall. The information display apparatus 10 has the holes 11h at different positions of the information display apparatus 10 to allow the user to freely select the place of the pen holder 30 and the place of the security lock when the user installs the information display apparatus 10 in a desired posture. The information display apparatus 10 has the hole 11h at seven positions in total.

Pen Holder

Figure 3:
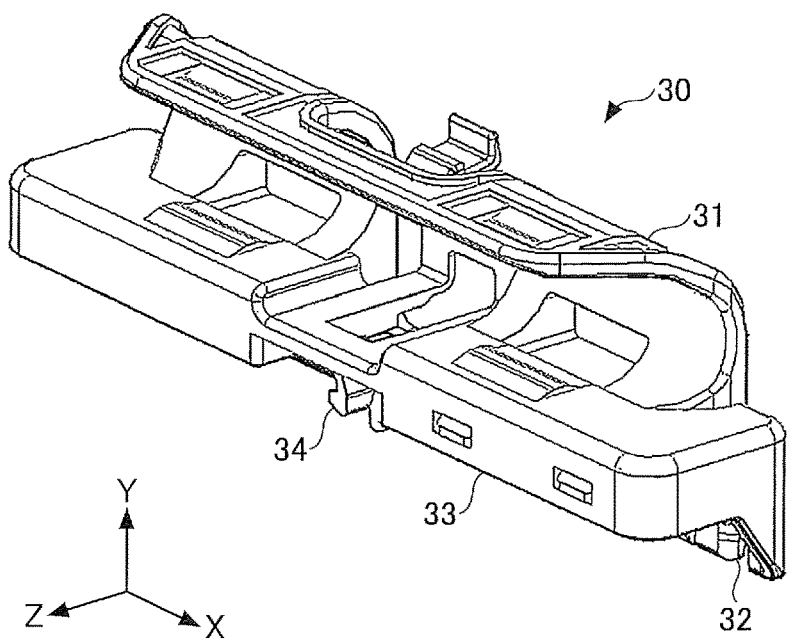
FIG. 3 is a perspective view of a pen holder for the information display apparatus according to one embodiment.
Figure 4:
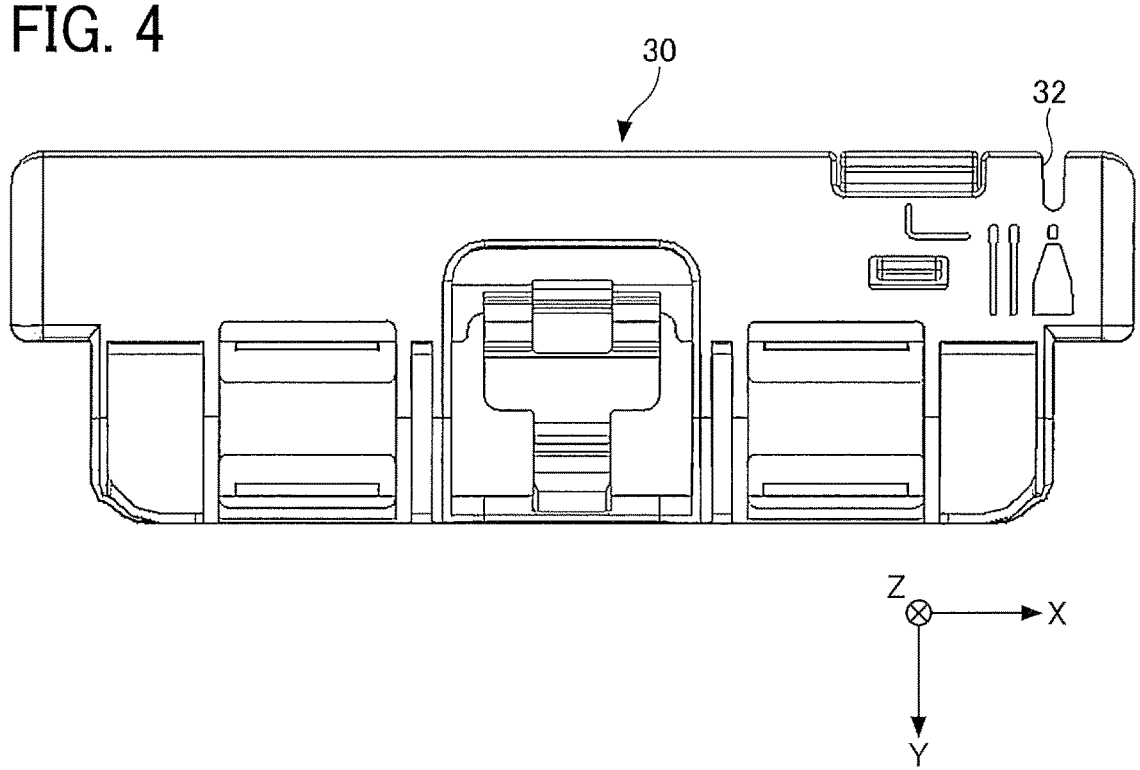
FIG. 4 is a side view of the pen holder illustrated in FIG. 3, for the information display apparatus according to one embodiment.
Figure 5:
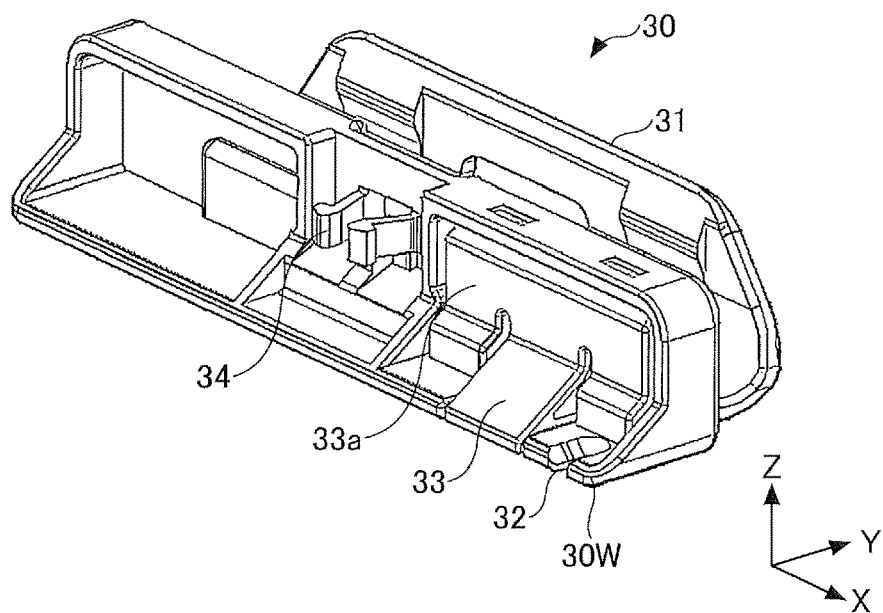
FIG. 5 is a perspective view of the pen holder illustrated in FIG. 3, for the information display apparatus according to one embodiment.

Next, the pen holder 30 will be described. FIG. 3 is a perspective view of a pen holder for the information display apparatus according to the present embodiment. FIG. 4 is a side view of the pen holder for the information display apparatus according to the present embodiment. Specifically, FIG. 4 is a side view of the pen holder as viewed from the −Z direction in FIG. 3. FIG. 5 is a perspective view of the pen holder for the information display apparatus according to the present embodiment, as viewed from a direction different from that of FIG. 3.

The pen holder 30 includes a pen holding portion 31 serving as a holder, a pulling-out portion 32, a replacement pen-tip storage 33, and a mounting portion 34. The pen holder 30 is made of, for example, a resin such as polyamide (nylon), polyethylene, polyacetal, or polycarbonate. As will be described later, since the width of a gripping portion in the pulling-out portion 32 is narrower than the pen tip 21 of the electronic pen 20, the pen holder 30 is preferably made of a soft resin so as to be easily deformed. The pen holder 30 is molded as a single piece with a same material by, for example, injection molding.

(Pen Holding Portion)

The pen holding portion 31 holds the electronic pen 20 so as to sandwich a side face of the electronic pen 20.

Pulling-Out Portion

The pulling-out portion 32 serves as a jig for pulling out the pen tip 21 of the electronic pen 20. The pulling-out portion 32 has such a shape that a part of the pen holder 30 has been cut out. The structure of the pulling-out portion 32 will be described in detail later.

In the information display system 1 according to the present embodiment, the pen holder 30 includes the pulling-out portion 32. Since the pen holder 30 for holding the electronic pen 20 is kept attached to the information display apparatus 10, there is little risk of loss. Further, since the user carries the pen holder 30 together with the information display apparatus 10, the user can reliably replace the pen tip at the user's desired timing using the pulling-out portion 32 of the pen holder 30.

Figure 6:
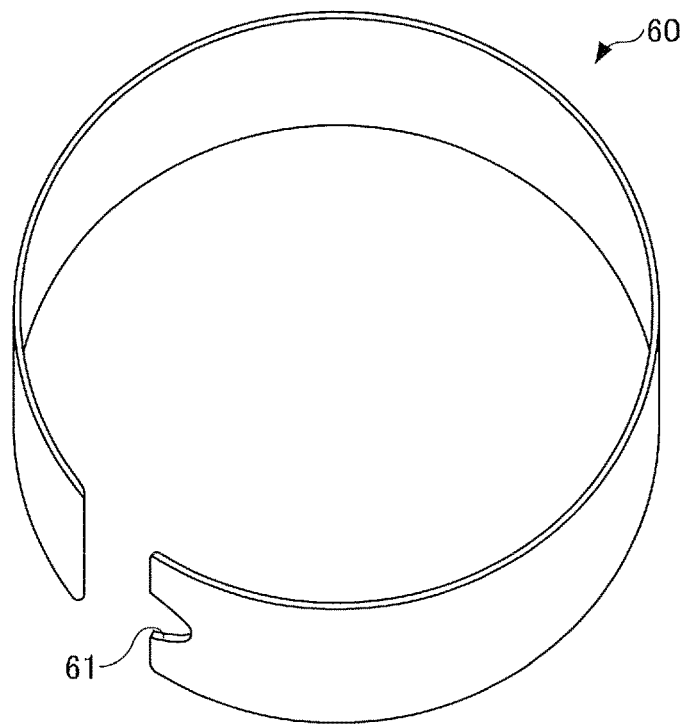
FIG. 6 is a perspective view of an example of a jig for pulling out a pen tip from an electronic pen.

Generally, for pulling out a pen tip from an electronic pen such as the electronic pen 20, a removal jig 60 as illustrated in FIG. 6 is used. The removal jig 60 of FIG. 6 includes a pulling-out portion 61 in which one end of a sheet metal shaped like a flat spring is cut in a semicircular shape. The removal jig 60 is used to grasp the pen tip with the pulling-out portion 61 and pull out the pen tip. The removal jig 60 illustrated in FIG. 6 is an example of a removal jig in which only one end is cut into a semicircle, but in some cases, each end may be cut into a semicircle. In addition, both ends may be flat, or one end or both ends may be jagged.

A jig such as the removal jig 60 illustrated in FIG. 6 is not carried together with the information display apparatus 10 but is stored somewhere. There may be a case where no jig is available when the user carries the portable information display apparatus 10 somewhere and wants to replace the pen tip at that site. Then, the replacement cannot be performed. The information display system 1 according to the present embodiment includes the pen holder 30 that is carried together with the information display apparatus 10, and the pen holder 30 includes the pulling-out portion 32. This configuration enables the user to reliably replace the pen tip at the timing when he or she wants to replace the pen tip.

In particular, in the case where the removal jig 60 as illustrated in FIG. 6 is packed together with the information display apparatus 10, there is a risk of loss of the removal jig 60. If the device is personally managed, the jig is also managed by the individual, so it is unlikely to be a problem. For example, a jig as illustrated in FIG. 6 may be packed together with a smartphone or tablet compatible with an electronic pen. By contrast, in the case of a shared device, the administrator and the user are different, and there may be cases where the user does not know where the jig is stored. The jig may be lost, or the jig is not at hand at a desired timing. Then, the pen tip cannot be replaced.

Replacement Pen-Tip Storage

Next, the replacement pen-tip storage 33 will be described.

Figure 7:
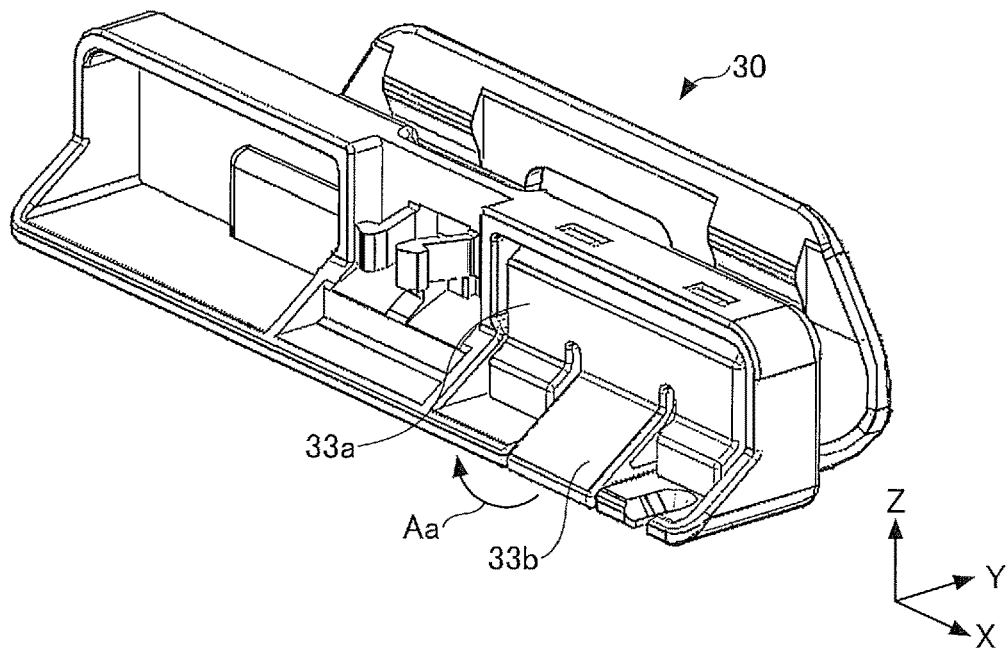
FIG. 7 is a view of a replacement pen-tip storage of the pen holder for the information display apparatus according to one present embodiment.
Figure 8:
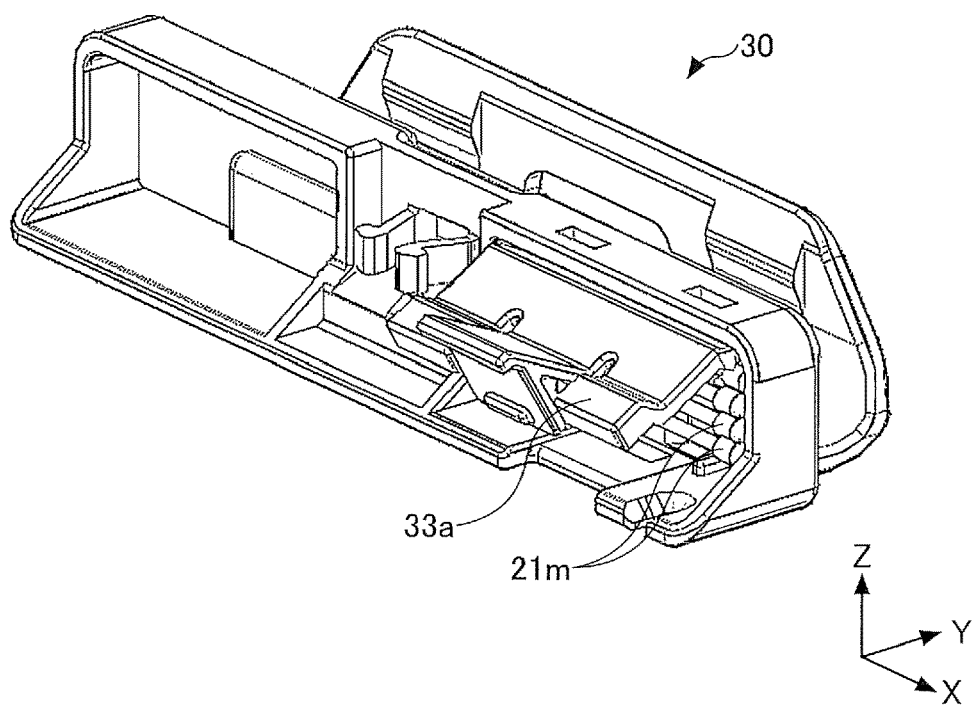
FIG. 8 is another view of the replacement pen-tip storage of the pen holder for the information display apparatus according to one present embodiment.
Figure 9:
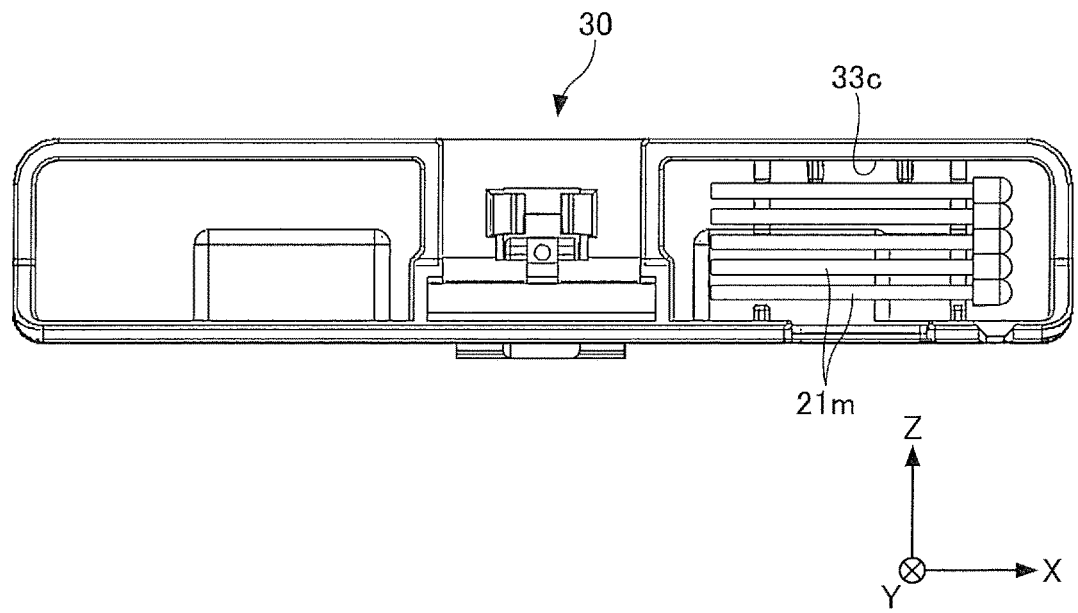
FIG. 9 is another view of the replacement pen-tip storage of the pen holder for the information display apparatus according to one present embodiment.

Each of FIGS. 7, 8 and 9 is a diagram illustrating the replacement pen-tip storage 33 of the pen holder 30 for the information display apparatus according to the present embodiment.

The replacement pen-tip storage 33 includes a lid 33a provided with a handle 33b. When the handle 33b of the lid 33a is pushed in the direction indicated by arrow Aa in FIG. 7, the lid 33a is removed. The replacement pen-tip storage 33 includes a pen-tip accommodating portion 33c (see FIG. 9) inside the lid 33a. As illustrated in FIG. 9, the pen-tip accommodating portion 33c has a capacity for storing a plurality of replacement pen tips 21m. In FIG. 9, five replacement pen tips 21m are stored, but the number of stored pen tips is not limited to five. The pen-tip accommodating portion 33c has a capacity for storing at least one replacement pen tip 21m. The pen-tip accommodating portion 33c has a box shape in which the replacement pen tips 21m are simply put without being held.

The lid 33a faces the frame 11 on the side face of the information display apparatus 10. This configuration prevents the lid 33a from being accessed when the pen holder 30 is attached to the information display apparatus 10. In the state where the pen holder 30 is attached to the information display apparatus 10, the opening or closing operation of the lid 33a interferes with the frame 11 on the side face of the information display apparatus 10, thus, inhibiting the opening or closing operation. This configuration eliminates the risk that the lid 33a is accidentally opened and the replacement pen tips 21m are scattered.

Note that the pulling-out portion 32 of the pen holder 30 is for pulling out the pen tip, and the replacement pen tip 21m described later is used for replacement of the pen tip of the electronic pen 20. For replacement of the pen tip, the replacement pen tip 21m is stored and carried together with the electronic pen 20.

In the information display system 1 according to the present embodiment, the pen holder 30 includes the replacement pen-tip storage 33 to store the replacement pen tips 21m. Therefore, if the pen holder 30 is carried, the pen tip can be replaced at the desired timing.

Mounting Portion

The mounting portion 34 is inserted into (coupled to) the security lock hole 11h in the information display apparatus 10. The pen holder 30 is attached to the information display apparatus 10 as the mounting portion 34 is coupled to the hole 11h.

Structure of Pulling-Out Portion

Next, the structure of the pulling-out portion 32 will be described. Each of FIGS. 10 and 11 is a diagram illustrating the pulling-out portion 32 of the pen holder 30 for the information display apparatus according to the present embodiment.

Figure 10:
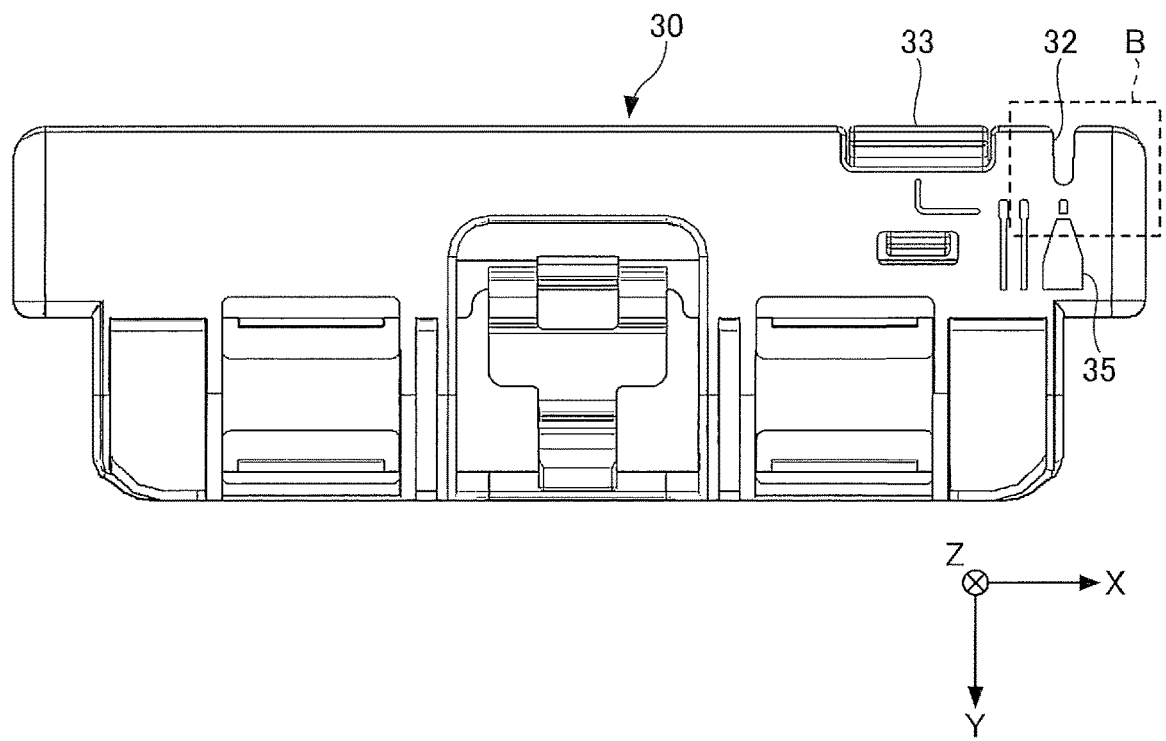
FIG. 10 is a view of a pulling-out portion of the pen holder for the information display apparatus according to one present embodiment.

As illustrated in FIG. 10, the pen holder 30 includes the pulling-out portion 32 in the vicinity of the replacement pen-tip storage 33. From the viewpoint of usability, the pulling-out portion 32 is disposed in the vicinity of the replacement pen-tip storage 33. Since pulling out the pen tip 21 and inserting the new pen tip 21 are a series of operations, the pulling-out portion 32 is in the vicinity of the replacement pen-tip storage 33 for convenience of the user. Similarly, from the viewpoint of usability, the pen holder 30 has an engraved mark 35.

Figure 11:
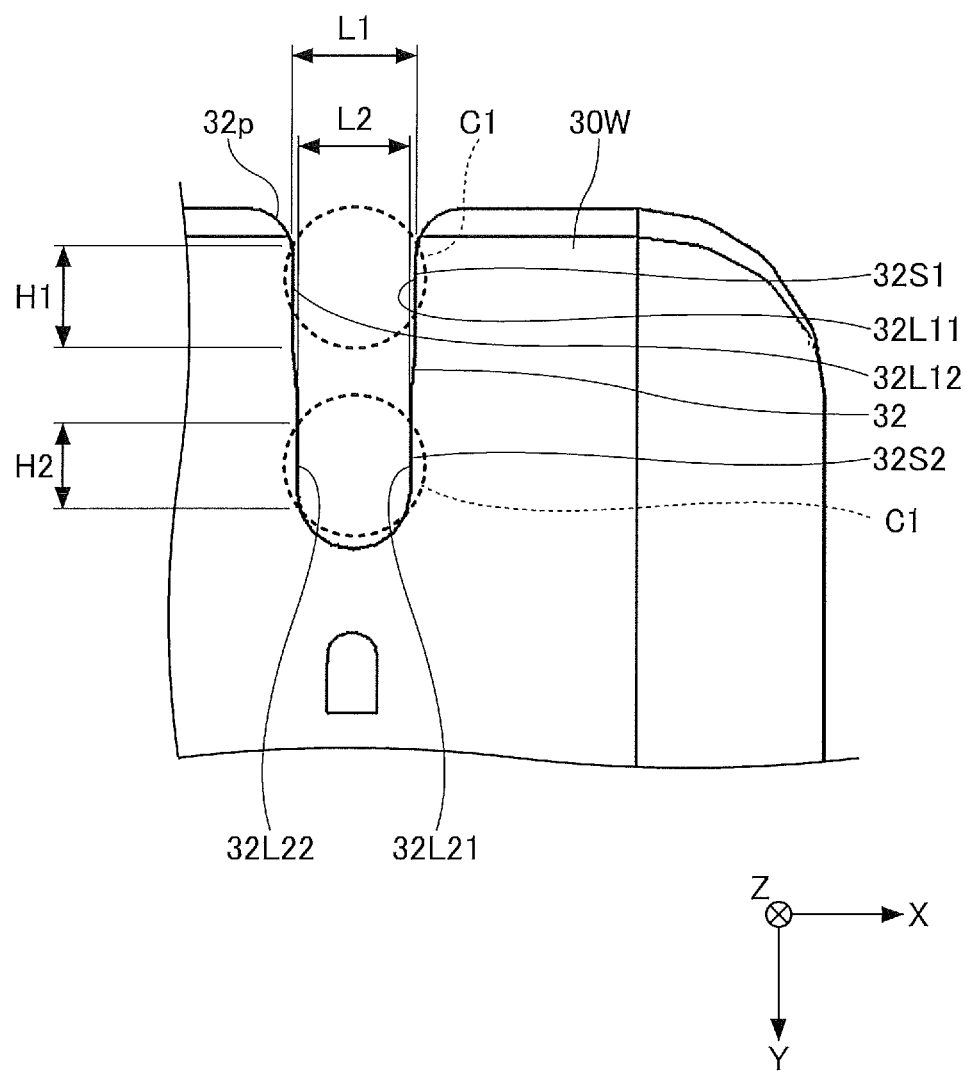
FIG. 11 is a diagram illustrating the pulling-out portion of the pen holder for the information display apparatus according to one embodiment.

FIG. 11 is an enlarged view of the pulling-out portion 32. The pulling-out portion 32 is substantially U-shaped such that a part of a plate-shaped wall portion 30W is cut out in the Y-axis direction. The pulling-out portion 32 has a two-stage groove structure and includes a first gripping portion 32S1 and a second gripping portion 32S2.

The first gripping portion 32S1 includes a pair of walls (a first wall 32L11 and a second wall 32L12) that defines ends of a groove in the x-axis direction. The first wall 32L11 and the second wall 32L12 extend linearly along the Y-axis direction (the longitudinal direction of the information display apparatus 10). The first wall 32L11 and the second wall 32L12 are opposite to each other across a space (groove). The second wall 32L12 is at a distance from the first wall 32L11 to the −X side in the X-axis direction intersecting the Y-axis direction.

Note that the term "linear" refers to, not limited to a strict straight line, but also, for example, a straight line within a standard manufacturing tolerance.

In the Y-axis direction, the first gripping portion 32S1 has a length H1 (that is, the first wall 32L11 and the second wall 32L12 have the length H1) that is equal to or larger than a radius of the pen tip 21.

In FIG. 11, a broken circle represents a diameter C1 of the pen tip 21. A width L1 of the first gripping portion 32S1, that is, the distance between the first wall 32L11 and the second wall 32L12 in the X-axis direction, is shorter than the diameter C1 of the pen tip 21. Since the width L1 of the first gripping portion 32S1 is shorter than the diameter C1 of the pen tip 21, the pair of the first wall 32L11 and the second wall 32L12 of the first gripping portion 32S1 grip the pen tip 21 when the pen tip 21 is inserted to the +Y side in the Y-axis direction from an opening 32p.

The second gripping portion 32S2 is disposed on the +Y side, that is, farther from the opening 32p (open end) than the first gripping portion 32S1. The second gripping portion 32S2 includes a pair of walls (a third wall 32L21 and a fourth wall 32L22) that define ends of the groove in the X-axis direction. The third wall 32L21 and the fourth wall 32L22 extend linearly along the Y-axis direction (the longitudinal direction of the information display apparatus 10). The third wall 32L21 and the fourth wall 32L22 are opposite to each other across a space (groove). The fourth wall 32L22 is at a distance from the third wall 32L21 to the −X side in the X-axis direction intersecting the Y-axis direction.

In the Y-axis direction, the second gripping portion 32S2 has a length H2 (that is, the third wall 32L21 and the fourth wall 32L22 have the length H2) that is equal to or larger than the radius of the pen tip 21.

A width L2 of the second gripping portion 32S2, that is, the distance between the third wall 32L21 and the fourth wall 32L22 in the X-axis direction is shorter than the diameter C1 of the pen tip 21. Since the width L2 of the second gripping portion 32S2 is shorter than the diameter C1 of the pen tip 21, the third wall 32L21 and the fourth wall 32L22 of the second gripping portion 32S2 grip the pen tip 21 when the pen tip 21 is inserted to the +Y side in the Y-axis direction from the opening 32p.

Further, the width L2 of the second gripping portion 32S2 is shorter than the width L1 of the first gripping portion 32S1.

The pen holder 30 according to the present embodiment has a two-stage structure having the first gripping portion 32S1 and the second gripping portion 32S2. With the two-stage structure including the first gripping portion 32S1 and the second gripping portion 32S2, the pen holder 30 according to the present embodiment can cope with variations in the diameter of the pen tip 21. The two-stage structure of the pen holder 30 according to the present embodiment including the first gripping portion 32S1 and the second gripping portion 32S2 is advantageous in easily guiding the pen tip 21 from the first gripping portion 32S1 to the narrower second gripping portion 32S2.

The number of stages of the pulling-out portion 32 is not limited to two. For example, the number of stages of the pulling-out portion 32 may be three or more or may be one.

Figure 12:
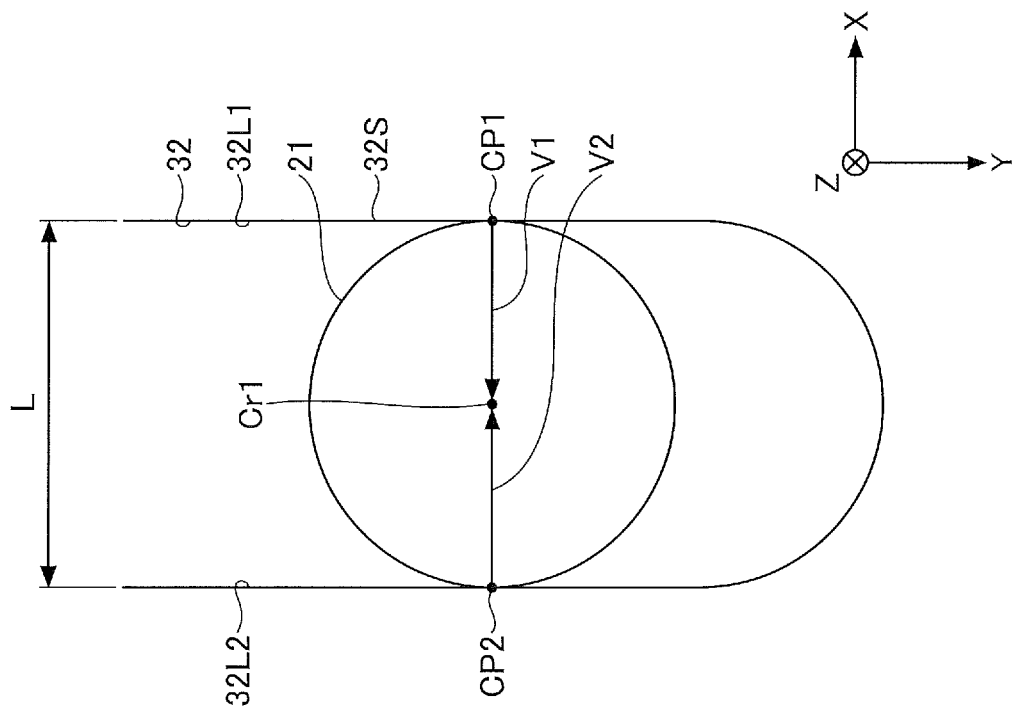
FIG. 12 is a diagram illustrating the pulling-out portion of the pen holder for the information display apparatus according to one embodiment.

The shape of the groove will be described. FIG. 12 is a diagram illustrating the shape of the pulling-out portion 32 of the pen holder 30 for the information display apparatus according to the present embodiment. In FIG. 12, as an example of the pair of walls defining the groove of the pulling-out portion 32, the first wall 32L11 and the second wall 32L12 will be described.

In the description referring to FIG. 12, each of the first gripping portion 32S1 and the second gripping portion 32S2 are collectively referred to as "gripping portion 32S", and a width L refers to the width (L1 or L2) of the gripping portion 32S. Further, a first wall 32L1 correspond to the first wall 32L11 of the first gripping portion 32S1 and the third wall 32L21 of the second gripping portion 32S2, and a second wall 32L2 correspond to the second wall 32L12 of the first gripping portion 32S1 and the fourth wall 32L22 of the second gripping portion 32S2.

Figure 13:
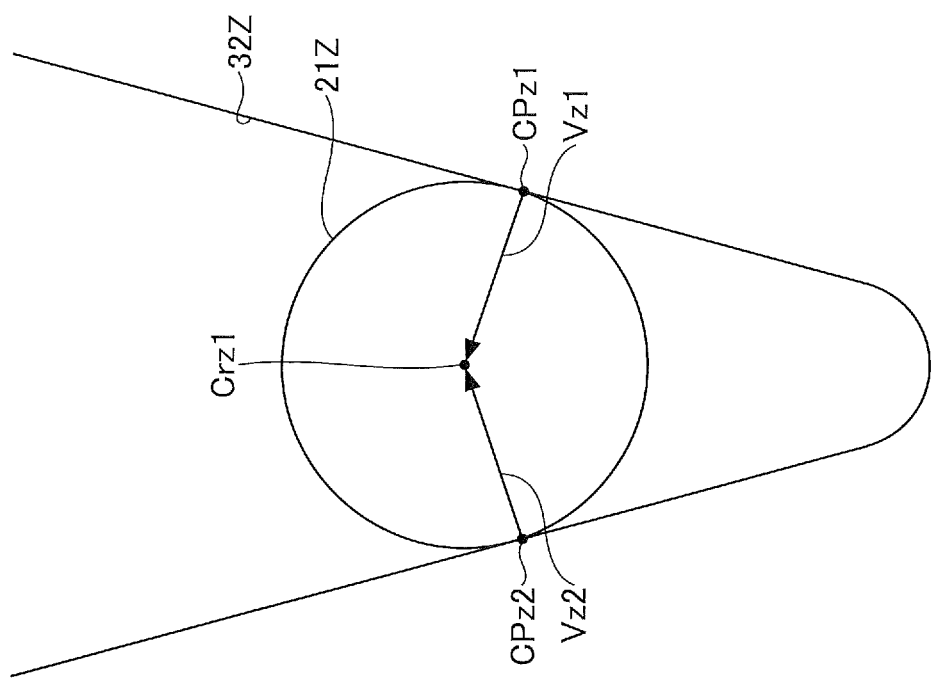
FIG. 13 is a diagram illustrating a pulling-out portion of a pen holder of a comparative example.

FIG. 13 is a diagram illustrating the shape of a pulling-out portion 32Z of a pen holder according to a comparative example.

As illustrated in FIG. 12, the pen holder 30 according to the present embodiment includes the gripping portion 32S that includes the first wall 32L1 and the second wall 32L2 extending linearly in the +Y direction in the Y-axis direction. The first wall 32L1 and the second wall 32L2 are substantially parallel. The gripping portion 32S is designed so that the pen tip 21 bites into the groove formed by the first wall 32L1 and the second wall 32L2, which are substantially parallel to each other.

The width L of the groove of the gripping portion 32S, that is, the distance between the first wall 32L1 and the second wall 32L2 is narrower than the diameter of the pen tip 21. Further, the length of the first wall 32L1 and the second wall 32L2 is equal to or larger than the radius of the pen tip 21.

The gripping portion 32S has the shape of a groove in which at least one side is open (e.g., +Y side). The width L of the groove of the gripping portion 32S is narrower than the diameter of the pen tip 21. Since the pen tip 21 that is thicker than the width L of the groove of the gripping portion 32S is forcibly pushed in, the gripping portion 32S is slightly distorted. When the pen holder 30 is made of, for example, resin, the elasticity of the resin generates a force to restore the distortion caused by the pen tip 21 pushed into the gripping portion 32S. The restoring force acts in the direction of a vector V1 from a contact CP1 and also in the direction of a vector V2 from a contact CP2.

The vector V1 and the vector V2 face each other from the contact CP1 and the contact CP2 toward a center Cr1 of the pen tip 21. By the force acting in the direction of the vector V1 and the direction of the vector V2, the gripping portion 32S grips the pen tip 21.

In addition, in order to cause distortion by the pen tip 21 pushed into the gripping portion 32S, the gripping portion 32S desirably has the shape of an open groove in which at least one end is open.

The pulling-out portion 32Z of the pen holder according to the comparative example has a substantially V-shaped groove. In the pulling-out portion 32Z, vectors Vz1 and Vz2 head for a center Crz1 of a pen tip 21Z respectively from contact points CPz1 and CPz2 between the pen tip 21Z and the pulling-out portion 32Z. Since the vectors Vz1 and Vz2 do not face each other, generally speaking, the pulling-out portion 32Z is not suitable for grasping something.

The pull-out structure with a substantially V-shaped groove enables pulling out of the pen tip because the pulling-out portion 32Z is made of a material that is harder than the material of the pen tip 21Z and can be made to bite into the pen tip 21Z. For example, the V-shaped pulling-out portion 32Z is made of metal and the edge of the V-shaped groove is sharp, the pen tip bites into the groove of the V-shaped pulling-out portion 32Z when by pushed into the groove. Then, the pen tip is grasped.

However, if the pulling-out portion 32Z is made of metal that is different from the material of the pen holder, the pulling-out portion 32Z and the pen holder are not molded as one piece. Then, the component unit price will increase. Further, from the viewpoint of recyclability, bonding or press-fitting of different materials is not preferable.

Note that the Y-axis direction is an example of a first direction, and the X-axis direction is an example of a second direction.

The information display system 1 according to the present embodiment includes the pen holder 30 that holds an electronic pen to be carried together with the information display apparatus 10, and the pen holder 30 includes the pulling-out portion 32. Owing to the pulling-out portion 32, the pen holder 30 according to the present embodiment enables the user to pull out the pen tip from the electronic pen and replace the pen tip at a desired timing.

Further, in the pen holder 30 according to the present embodiment, the pulling-out portion 32 reliably grips the pen tip of the electronic pen with the gripping portion 32S having the first wall 32L1 and the second wall 32L2 extending linearly in the first direction. The pen holder 30 can pull out the pen tip of the electronic pen by reliably gripping the pen tip of the electronic pen with the gripping portion 32S.

Further, according to the present embodiment, the pen holder 30 integral with the pulling-out portion 32 is manufactured at low cost.

Further, the pen holder 30 according to the present embodiment includes the replacement pen-tip storage 33. This structure enables the user to pull out the pen tip at a desired timing and set the replacement pen tip 21*m* in the electronic pen.

By contrast, in a general method for replacing a pen tip, a jig (for example, illustrated in FIG. 6) and a replacement pen tip are packed together with the product (electronic pen), and the jig is used to pinch and pull out the pen tip from the electronic pen, and insert the replacement pen tip into the electronic pen.

In the method of replacing the pen tip using a jig and a replacement pen tip packed together with the product, if the jig and replacement pen tip are not stored properly, there is a risk of loss thereof. Further, in the method of replacing the pen tip using a jig, if a portable display is carried somewhere and the jig or a replacement pen tip are not available at hand, the user cannot replace the pen tip in the place where the display is carried. Further, since a dedicated jig is bundled with the product, the unit price of the product is increased by the amount of the jig.

According to the present embodiment, the pen holder 30 including the pulling-out portion 32 and the replacement pen-tip storage 33 enables the user to replace the pen tip of the electronic pen at a desired timing. Further, the present embodiment provides an inexpensive pen holder 30 that enables the user to replace the pen tip of the electronic pen at a desired timing.

The present disclosure is not limited to the configurations of the above-described embodiment, and another element may be combined with the configuration described above. The configuration and combination of elements can be modified without departing from the spirit of the present disclosure and can be appropriately determined according to the form of application. For example, elements and/or features of different illustrative embodiments may be combined with each other and/or substituted for each other within the scope of the present invention.

The invention claimed is:

1. A pen holder comprising:
   a holder configured to hold an electronic pen, the electronic pen including a replaceable pen tip that contacts a screen of a display apparatus for input to the display apparatus; and
   a pulling-out portion having an open end in a first direction and configured to pull out the pen tip, the pulling-out portion including a gripping portion including:
   a first wall linearly extending in the first direction; and
   a second wall linearly extending in the first direction and disposed at a distance from the first wall in a second direction intersecting the first direction,
   the first wall and the second wall being configured to grip the pen tip inserted from the open end in the first direction;
   wherein the gripping portion is referred to as a first gripping portion, and the pulling-out portion further includes a second gripping portion farther from the open end in the first direction from the first gripping portion,
   wherein the second gripping portion includes:
   a third wall linearly extending in the first direction; and
   a fourth wall linearly extending in the first direction and disposed at a distance from the third wall in the second direction,
   wherein the distance between the third wall and the fourth wall in the second direction is shorter than the distance between the first wall and the second wall in the second direction.

2. The pen holder according to claim 1, wherein the distance between the first wall and the second wall in the second direction is shorter than a diameter of the pen tip.

3. The pen holder according to claim 1, further comprising a mounting portion configured to mount the pen holder on the display apparatus.

4. The pen holder according to claim 3, wherein the mounting portion is configured to fit in a security lock hole in the display apparatus.

5. The pen holder according to claim 1, wherein the holder and the pulling-out portion are made of a same resin.

6. The pen holder according to claim 1, further comprising a replacement pen-tip storage including a lid, the replacement pen-tip storage configured to store a replacement pen tip,
   wherein the lid is configured to face a side face of a housing of the display apparatus when the pen holder is attached to the display apparatus.

7. The pen holder according to claim 1, wherein the first wall and the second wall both extend in a thickness direction of a plate-shaped wall portion; and
   wherein the first direction and the second direction are perpendicular to the thickness direction.

8. The pen holder according to claim 1, wherein the third wall extends from the first wall, and the fourth wall extends from the second wall.

9. The pen holder according to claim 1, wherein the pulling-out portion is substantially U-shaped such that a part of the plate-shaped wall portion is cut out in the first direction.

10. A display system comprising:
    a display apparatus; and
    a pen holder including:
    a holder configured to hold an electronic pen, the electronic pen including a replaceable pen tip that contacts a screen of the display apparatus for input to the display apparatus; and
    a pulling-out portion having an open end in a first direction and configured to pull out the pen tip, the pulling-out portion including a gripping portion including:
    a first wall linearly extending in the first direction; and
    a second wall linearly extending in the first direction and disposed at a distance from the first wall in a second direction intersecting the first direction, the first wall and the second wall being configured to grip the pen tip inserted from the open end in the first direction;

wherein the gripping portion is referred to as a first gripping portion, and the pulling-out portion further includes a second gripping portion farther from the open end in the first direction from the first gripping portion, wherein the second gripping portion includes:
a third wall linearly extending in the first direction; and
a fourth wall linearly extending in the first direction and disposed at a distance from the third wall in the second direction, wherein the distance between the third wall and the fourth wall in the second direction is shorter than the distance between the first wall and the second wall in the second direction.

* * * * *